United States Patent
Tan et al.

(10) Patent No.: US 6,853,158 B2
(45) Date of Patent: Feb. 8, 2005

(54) ADAPTIVE RIPPLE SUPPRESSION/COMPENSATION APPARATUS FOR PERMANENT MAGNET LINEAR MOTORS

(75) Inventors: Kok Kiong Tan, Singapore (SG); Tong Heng Lee, Singapore (SG); Huifang Dou, Singapore (SG); Ser Yong Lim, Singapore (SG)

(73) Assignees: The National University of Singapore, Singapore (SG); Singapore Institute of Manufacturing Technology, Singapore (SG)

( * ) Notice: Subject to any disclaimer, the term of this patent is extended or adjusted under 35 U.S.C. 154(b) by 182 days.

(21) Appl. No.: 09/840,040

(22) Filed: Apr. 24, 2001

(65) Prior Publication Data

US 2002/0063539 A1 May 30, 2002

(30) Foreign Application Priority Data

Apr. 25, 2000 (SG) ..................... 200002284-8

(51) Int. Cl.[7] ................................ H02P 5/00
(52) U.S. Cl. ..................... 318/135; 318/687
(58) Field of Search ................. 318/135, 687

(56) References Cited

U.S. PATENT DOCUMENTS 5,852,355 A * 12/1998 Turner ................. 318/701
6,039,028 A * 3/2000 Stuntz et al. .......... 123/436
6,281,650 B1 * 8/2001 Yutkowitz ............. 318/561
6,396,234 B1 * 5/2002 Tateishi ................ 318/632

OTHER PUBLICATIONS

K.K. Tan et al., "Learning Enhanced Motion Control of Permanent Magnet Linear Motor", date unknown.
D.M. Alter et al., "Control of Linear Motors for Machine Tool Feed Drives: Design and Implementation of H. Optimal Feedback Control[1]", Journal of Dynamic Systems, Measurement, and Control, Dec. 1996, vol. 118, pp. 649–656.
G. Otten et al., "Linear Motor Motion Control Using a Learning Feedforward Controller", IEEE/ASME Transactions on Mechatronics, vol. 2, No. 3, Sep. 1997 pp. 179–187.
B. Yao et al., "Adaptive Robust Control of Siso Nonlinear Systems in a Semi–Strict Feedback Form*", *Automatica*, vol. 33, No. 5, pp. 893–900, 1997, month unknown.
K.K. Tan et al., "Adaptive Robust Motion Control for Precise Trajectory Tracking Applications", ISA Transactions 40 (2001) 57–71, month unknown.

* cited by examiner

Primary Examiner—Thomas M. Dougherty
Assistant Examiner—Judson H. Jones
(74) Attorney, Agent, or Firm—Birch, Stewart, Kolasch & Birch, LLP

(57) ABSTRACT

A ripple suppressor/compensator useful in the general area of motion control and applicable to a wide range of servomechanisms exhibiting a force ripple characteristics, including the permanent magnet linear motors. An adaptive feedforward control signal is generated which compensates for the ripple force, thus allowing for more precise tracking performance to be achieved.

7 Claims, 3 Drawing Sheets

COMPARATIVE ART

ADAPTIVE RIPPLE SUPPRESSION/COMPENSATION APPARATUS FOR PERMANENT MAGNET LINEAR MOTORS

FIELD OF THE INVENTION

The invention generally relates to the field of motion control, and more particularly to an adaptive ripple suppression/compensation design which enhances the tracking performance of high precision motion control systems such as those based on permanent magnet linear motors (PMLM).

BACKGROUND OF THE INVENTION

Among the electric motor drives, permanent magnet linear motors (PMLM) are probably the most naturally suited to applications involving high speed and high precision motion control. The increasingly widespread industrial applications of PMLMs in various semiconductor processes, precision metrology and miniature system assembly are self-evident testimonies of the effectiveness of PMLMs in addressing the high requirements associated with these application areas. The main benefits of a PMLM include the high force density achievable, low thermal losses and, most importantly, the high precision and accuracy associated with the simplicity in mechanical structure. Unlike rotary machines, linear motors require no indirect coupling mechanisms as in gear box, chain and screw couplings. This greatly reduces the effects of contact-type non-linearities and disturbances such as backlash and frictional forces, especially when they are used with aerostatic or magnetic bearings. However, the advantages of using mechanical transmission are also consequently lost, such as the inherent ability to reduce the effects of model uncertainties and external disturbances. Therefore, a reduction of these effects, either through proper physical design or via the control system, is of paramount importance if high-speed and high precision motion control is to be achieved.

A significant and well-known nonlinear effect in the dynamics of the PMLM is the phenomenon of force ripple arising from the magnetic structure which exhibit characteristics that are position and velocity dependent. This is a prominent factor limiting the performance of PMLMs. Periodic disturbances also occur in a variety of engineering applications. In data storage systems, for example, the eccentricity of the track on a disk requires a periodic movement of the read/write head at the frequency of the rotation of the disk. In the rotary type DC motors and stepper motors, torque pulsations occur at the frequency of rotation of the motors, due to the tendency of the permanent magnets to align themselves along directions of minimum reluctance. In switched reluctance motors, torque ripples also arise due to the saturation effect and the variation of magnetic reluctance leading to highly nonlinear characteristics which result in the ripples.

A great deal of effort has been devoted to overcome the difficulties associated with the nonlinear rippling effects. Among the prior art, $H_\infty$ optimal feedback control has been suggested to provide a high dynamic stiffness to external disturbances (D. M. Alter and T. C. Tsao, Control of linear motors for machine tool feed drives: design and implementation of $H_\infty$ optimal feedback control ASME J. of Dynamic systems. Measurement and Control, vol. 118, pp649–658, 1996). A neural-network feed-forward controller has also been proposed to reduce positional inaccuracy due to reproducible and slowly time-varying disturbances (G. Otten, T. J. A. de Vries, J. van Amerongen, A. M. Rankers and E. W. Gaal, Linear motor motion control using a learning forward controller, IEEE/ASME Trans. on Mechatronics, vol.2(3), pp179–187, 1997). Yao and Tomizuka have proposed an adaptive robust control approach and applied it subsequently to high speed, high accuracy motion control of machine tools (B. Yao and M. Tomizuka, Adaptive robust control of SISO nonlinear systems in a semi-strict feedback form, Automatica, vol. 33(5), pp.893–900, 1997.). A radial-basis function has been proposed by Tan et al as part of a composite control scheme to reduce errors arising from nonlinear uncertain remnants which were not considered in the linear control (K. K. Tan, S. N. Huang, H. F. Dou, S. Y. Lim, S. J. Chin, Adaptive Robust Motion Control for Precise Trajectory Tracking Applications, Mechatronics-submitted, 1999.). Iterative learning control has also been proposed in the past, where it has been targeted at applications involving repeated iterative operations (K. K. Tan, T. H. Lee, S. Y. Lim, and H. F. Dou, Learning enhanced motion control of permanent magnet linear motor, Proc. of the third IFAC International Workshop on Motion Control, Grenoble, France, pp397–402, 1998.). In all these works, while the efforts were geared towards the compensation of nonlinear uncertainties, there has been no explicit modelling of the ripple force phenomenon, and consequently, no direct approach to attempt to suppress these forces which should yield direct improvement in tracking performance.

SUMMARY OF THE INVENTION

According to a first aspect the present invention a control system for controlling a plant having an operating characteristic which describes the translation of a plant input to a plant output, wherein the plant characteristic has a linear component and a non-linear component, the control system comprising a feedback control function, and a feed-forward control function, such that a demand signal is simultaneously applied to respective inputs of the feedback and feed-forward control functions and respective outputs of the feedback and feed-forward control functions are summed together to generate the plant input, the feed-forward control function having a first component which is a function of a model of the linear component of the plant characteristic, and a second component which is an adaptive function to compensate for the non-linear component of the plant characteristic, and the adaptive function being approximately modelled on the non-linear component of the plant characteristic and having adaptive laws which vary parameters of the adaptive function with time such that the adaptive function approaches the non-linear component of the plant characteristic.

In a preferred embodiment of the invention, the non-linear component of the plant characteristic is of the form:

$$u_{ripple} = A(x)\sin(\omega x + \phi) = A_1(x)\sin(\omega x) + A_2(x)\cos(\omega x),$$

where x is the plant variable,
and where the adaptive function has the form:

$$u_{AFC} = a_1(x(t))\sin(\omega x) + a_2(x(t))\cos(\omega x),$$

where $$\dot{a}_1(t) = -ge\dot{x}_d \sin(\omega x),$$

$$\dot{a}_2(t) = -ge\dot{x}_d \cos(\omega x),$$

e is an error signal given by:

$$e = (x_d - x),$$

g is an adaptation gain and is greater than 0, $x_d$ is the desired function of the plant variable and ω is related to 1/period of the non-linear component of the plant characteristic, such that the adaptive feed-forward control function continuously adjusts the parameters $a_1$, & $a_2$ in response to the error signal e.

One example of the type of plant to be controlled by an embodiment of the invention is a permanent magnet linear motor (PMLM), in which the plant variable x represents an instantaneous position of a translator of the linear motor, the desired function of the plant variable $x_d$ represents the desired trajectory of the translator and the PMLM has a magnetic structure having a pole pitch $x_p$, such that $\omega = 2\pi/x_p$. In embodiments of this type, the adaptation gain has a value of in the range of 0–1, and preferably in the range of 0.2–0.6. Values of around 0.2 have been found to work well in practice, but other types of motor will require different values of adaptive gain for best performance.

In the preferred embodiment, the inputs to the ripple suppressor include a user specification of the pole pitch of the permanent magnet, the desired motion trajectory and the actual position measurement. These parameters allow the construction of a model for the ripple characteristics in terms of a sinusoidal function with respect to the displacement of the translator of the PMLM. The function of the preferred ripple suppressor is to continuously adjust the amplitude of the sinusoidal function based on the tracking error so that the ripple model approaches the actual characteristics optimally. The output from the ripple suppressor is a feed-forward control signal to be input to the PMLM which will compensate the ripple force accordingly. This input is in addition to other control input which the PMLM may already be receiving from the commissioned motion control system.

Preferably, the feedback controller is a Proportional/Integral/Derivative or, 3-term controller, hereinafter referred to as a PID controller.

The preferred embodiments of the invention provide a ripple suppression/compensation apparatus which can yield improvement in the tracking performance of servo mechanisms with a more specific view towards application to a PMLM. Because of its adaptive characteristics, it is applicable to different versions of PMLM without necessitating a change in the physical design.

Embodiments of the invention facilitate smooth precise motion while uncompromising on the maximum force achievable.

BRIEF DESCRIPTION OF THE DRAWINGS

An embodiment of the invention will now be described by way of example, with reference to the accompanying drawings, in which:

FIGS. 3(a)–(c) are graphs of control system signals, showing the tracking ability of an example of a system, such as that of FIG. 2, according to the present invention, in which FIG. 3(a) shows a signal representing a desired trajectory $x_d$, FIG. 3(b) represents the error signal ($x_d$–x), and FIG. 3(c) represents the control signal provided at the input of the plant and derived by summing the outputs of the PID Controller, the Feed Forward Controller and the Adaptive Feed Forward Controller, and FIGS. 4(a)–(c) are graphs of control system signals, showing the tracking ability of a system without the adaptive feed forward component of the present invention in which FIG. 4(a) represents a signal representing a desired trajectory $x_d$, FIG. 4(b) represents the error signal ($x_d$–x), and FIG. 4(c) represents the control signal U provided at the input of the plant and derived by summing the outputs of the PID Controller, the Feed Forward.

DETAILED DESCRIPTION OF THE PREFERRED EMBODIMENTS

Figure 1:
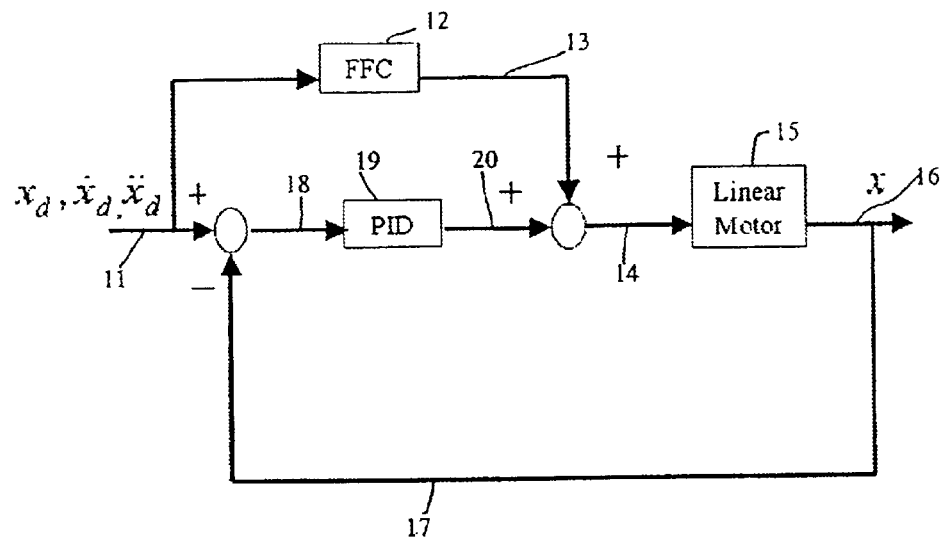
FIG. 1 is a block diagram of a typical prior art motion control structure, PID-Proportional-Integral-Derivative, FFC-FeedForward Control.
Figure 2:
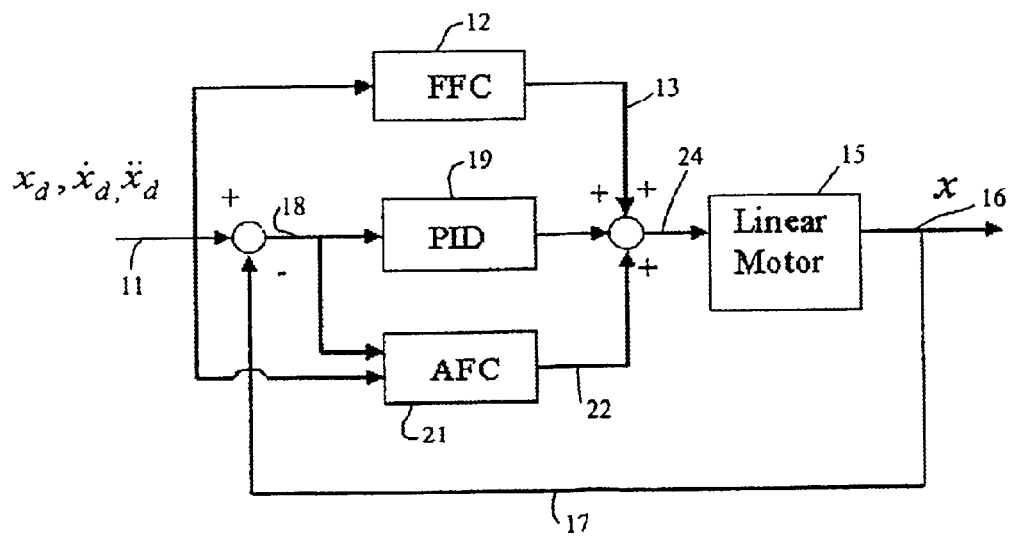
FIG. 2 is a block diagram of an embodiment of a control system according to the present invention, PID-Proportional-Integral-Derivative, FFC-FeedForward Control, AFC-Adaptive Feedforward Control.

Referring to FIGS. 1 and 2, block diagrams are provided of two control systems for a permanent magnet linear motor. The FIG. 1 system is a prior art system employing feedback and feed-forward control, whereas the FIG. 2 system is an illustrative embodiment of the present invention and employs adaptive feed-forward control (AFC) as well as feed-forward control (FFC), and feedback control (FBC) which in this example is a Proportional/Integral/Derivation (PID) controller.

Traditionally, where systems required an output state to be accurately controlled, adjusted and maintained at a predetermined value, feedback control systems were employed to continually adjust input to the system being controlled in order to maintain the required output. Typically, such feedback systems measured an output parameter 16 known as he measured variable or plant variable and compared it with a desired value 11 of that variable to calculate an error signal 18.

It is common in single loop feedback systems to employ Proportional/integral/Derivative (PID) controllers 19 (also known as 3-term controllers) which have as their input, the error signal (e) 18 and have as their output a control signal ($u_{PID}$) 20 given by:

$$u_{PID} = -k_1 e + k_2 \int e\, dt + k_3 \frac{de}{dt}$$

where $k_1$, $k_2$ & $k_3$ are constants chosen for the particular plant.

The principle of feed-forward control is that if the characteristics of the device to be controlled are modelled, the model may be used to predict the input required to obtain a desired change in output. By applying a demand signal 11, representing the desired system output to the input of the feed-forward controller 12, a component 13 is added to the PID controller output 20 to produce signal 14 of the device 15 being controlled such that, assuming perfect modelling, the output 16 should be caused to change to the desired output. Unfortunately, it is rarely possible to perfectly model a physical device, and therefore, feed-forward control cannot replace the traditional feedback control systems, but, merely supplement them. Feed-forward control, can however, significantly improve system response by quickly adjusting the plant input for rapidly changing demand signals. To achieve similar response with a traditional feedback controller, would require high loop gains and would increase the possibility of instability. With non-linear systems, these problems are even more evident and the advantages of feed-forward control even greater, however, it is often not possible to model non-linear systems with sufficient accuracy, particularly when the non-linear response characteristic of the plant being controlled is a function of manufacturing tolerances of the plant. To deal with these shortcomings of conventional feed-forward control, it is now proposed to employ a form of adaptive feed-forward control which broadly models the non-linear characteristics of the plant being controlled, but includes an adaptive function that continuously adjusts the feed-forward parameters.

In FIG. 2, the system input 11 is fed to the adaptive feed-forward controller (AFC) 21 as is the error signal 18 and the AFC 21 processes these inputs to produce its own control signal component ($u_{AFC}$) 22 which is added to the other control signals 13, 20 to produce the plant input 24.

In the case of a PMLP, the non-linear characteristic is primarily due to the force ripple phenomenon described previously. In the preferred embodiment the force ripple phenomenon is viewed and modelled as a response to a virtual input to the PMLM described in the form of a periodic sinusoidal signal:

$$u_{ripple}=A(x)\sin(\omega x+\phi)=A_1(x)\sin(\omega x)+A_2(x)\cos(\omega x), \quad (1)$$

where $$\omega = \frac{2\pi}{x_p}$$

and $x_p$ is the pole pitch of the magnet structure. $\phi$ is the phase specification providing a reference point to the sinusoidal function. $A(x)$, $A_1(x)$ pand $A_2(x)$ are functions of the displacement x of the translator of the linear motor.

A dither signal is thus designed correspondingly to eradicate this virtual force as:

$$u_{AFC}=a_1(x(t))\sin(\omega x)+a_2(x(t))\cos(\omega x). \quad (2)$$

Perfect cancellation will be achieved when $$a_1^*(x)=-A_1(x), a_2^*(x)=-A_2(x). \quad (3)$$

Feed-forward compensation schemes are well known to be sensitive to modelling errors which inevitably result in significant remnant ripples. An adaptive approach is thus adopted so that $a_1$ and $a_2$ will be continuously adapted based on desired trajectories and prevailing tracking errors. Let $$a = \begin{bmatrix} a_1(x) \\ a_2(x) \end{bmatrix}, \theta = \begin{bmatrix} \sin(\omega x) \\ \cos(\omega x) \end{bmatrix}, a^* = \begin{bmatrix} -A_1(x) \\ -A_2(x) \end{bmatrix}. \quad (4)$$

The plant output due to AFC is then given by:

$$x_a=P[a-a^*]^T\theta, \quad (5)$$

where P denotes the plant.

(5) falls within the standard framework of adaptive control theory. Possible update laws for the adaptive parameters will therefore be:

$$\dot{a}_1(x(t))=-ge\sin(\omega x), \quad (6)$$

$$\dot{a}_2(x(t))=-ge\cos(\omega x), \quad (7)$$

where g>0 is an arbitrary adaptation gain, $e=x_d-x$ is the tracking error where $x_d$ is the desired position trajectory.

Differentiating (6) and (7) with respect to time, the following equations are obtained $$\dot{a}_1(t)=-ge\dot{x}_d\sin(\omega x), \quad (8)$$

$$\dot{a}_2(t)=-ge\dot{x}_d\cos(\omega x), \quad (9)$$

In other words, the adaptive update laws (8) and (9) can be applied as an adjustment mechanism such that $a_1(t)$ and $a_2(t)$ in (2) converge to their true values.

Implementation

As described above, the physical implementation of the ripple suppression/compensation apparatus is preferably by means of a microprocessor/digital-computer using known techniques to implement various aspects of the above described function. However, as will be appreciated by those of ordinary skills in the art, analog electronic circuits may be used to fulfil many parts of this purpose.

For the preferred digital implementation of the control apparatus, an interface between the (digital) controller apparatus and the analog (input) measurements and actuator (output) signals uses analog-to-digital and digital-to-analog converters, respectively, in the same manner as used by conventional digital controllers. Accordingly, the present disclosure omits description of such converters. Similarly, the functions of the ripple suppressor/compensator are implemented as a software program (stored in a Programmable Read Only Memory of the microprocessor/digital-computer, for example) for processing the stored data representing the converted input and output signals. The input parameter set, time functions and other data variables are held in the Random Access Memory of the microprocessor/digital computer. The software used for this purpose by the present invention is the same as in other digitally implemented controllers and, accordingly, a detailed description thereof is omitted.

Experimental Example

In this experimental example, a Linear Drive tubular linear motor (LD3810) was employed. The test bed system was equipped with a Renishaw optical encoder with an effective resolution of 1 Tm. The dSPACE control environment and rapid prototyping system was used, employing the DS1102 board.

The desired trajectories used in this experiment are given by:

$$x_d(\tau)=10^6[x_0+(x_0-x_f)(15\tau^4-6\tau^5-10\tau^3)], \quad (10)$$

$$\dot{x}_d(\tau)=10^6(x_0-x_f)(60\tau^3-30\tau^4-30\tau^2), \quad (11)$$

where $10^6$ is used to normalize the system units to $\mu$m. $x_d$ and $\dot{x}_d$ denote the desired position and velocity trajectories, $x_0=0$ and $x_f=0.21$ m denote the initial and final positions, respectively. $\tau=t/(t_f-t_0)$, where $t_0=2$ seconds and $t_f=5$ seconds are the initial time and final time of the trajectory.

As with feedback control, the gain (g) chosen for the adaptive feed-forward controller will be a trade off between lower values which give reliable performance and higher values which give faster tracking. The optimum value will depend on factors related to the configuration and use of the system and is usually adjusted by trial and error. Values in the range of 0–1 and preferably in the order of 0.2 have been found to be useful with the particular system described above.

Figures 3A, 3B, 3C:
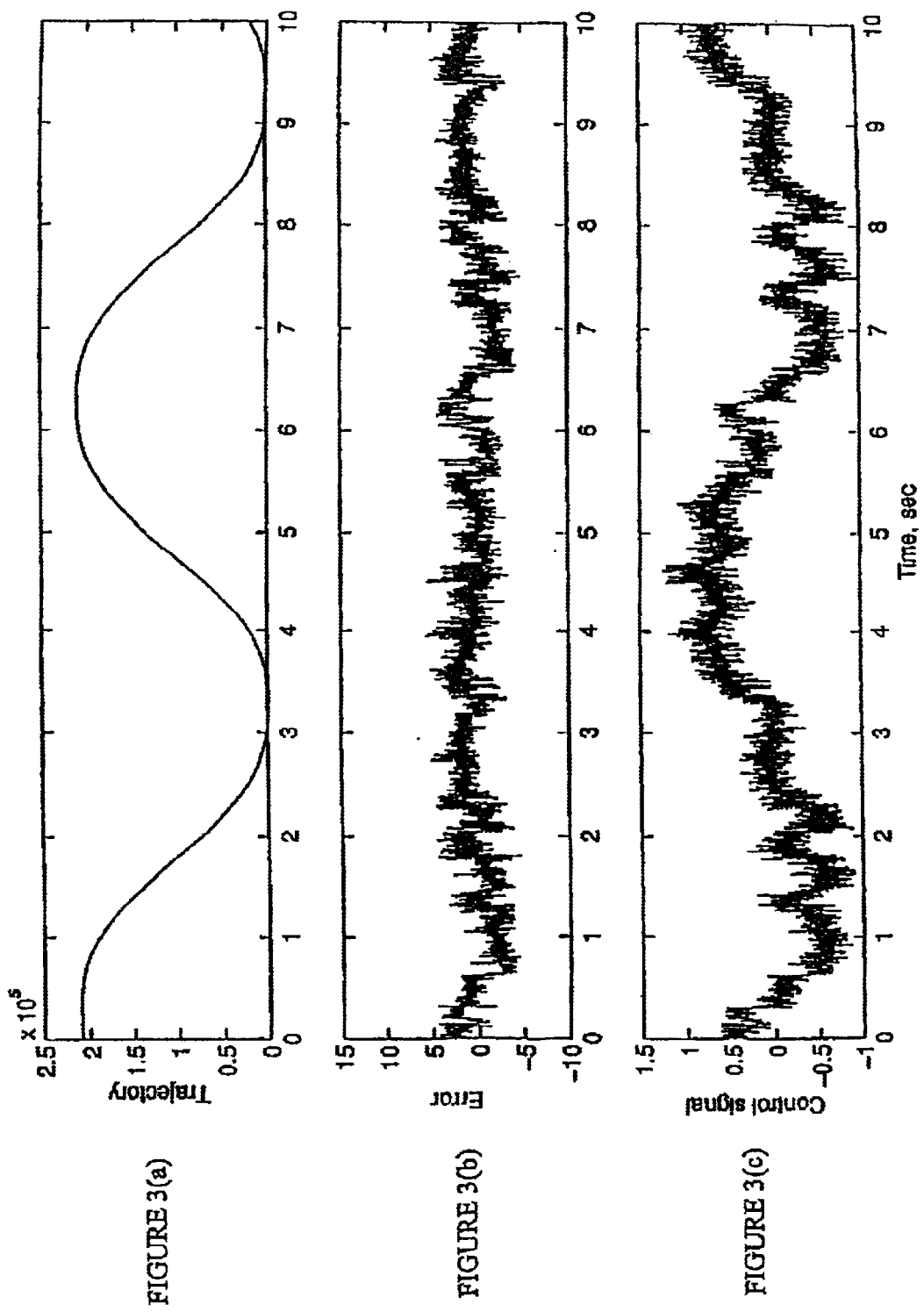
Figure 4A:
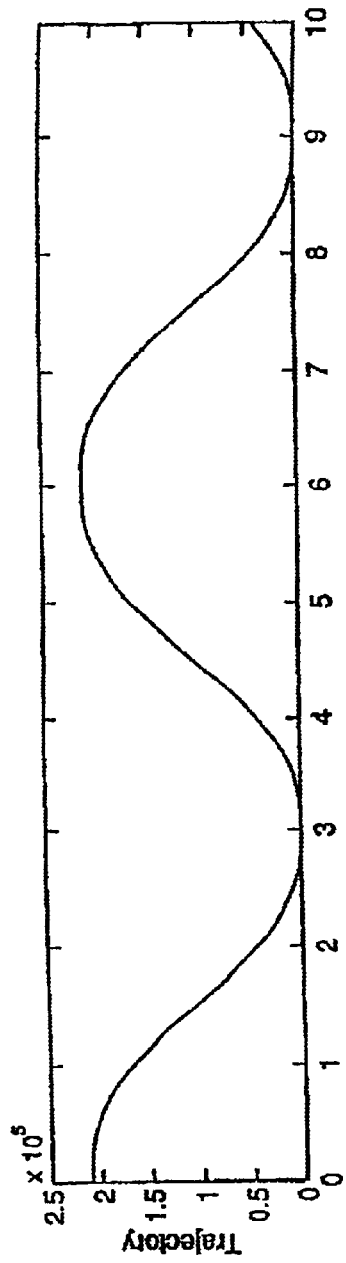
Figure 4B:
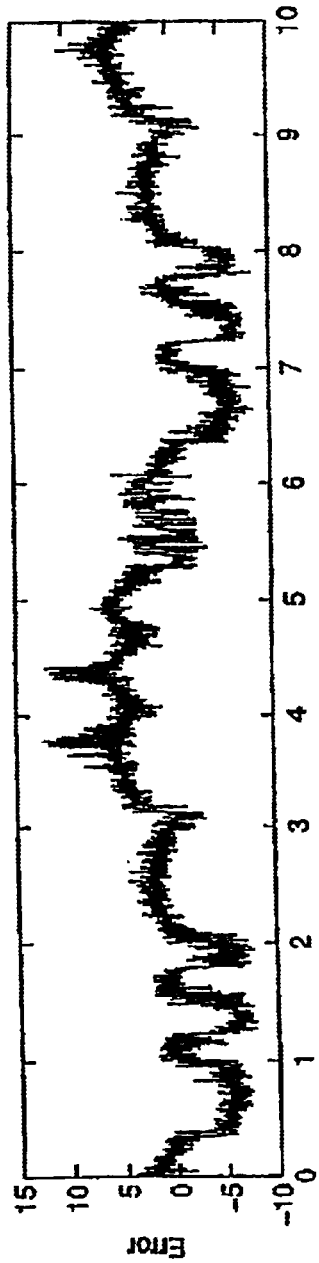
Figure 4C:
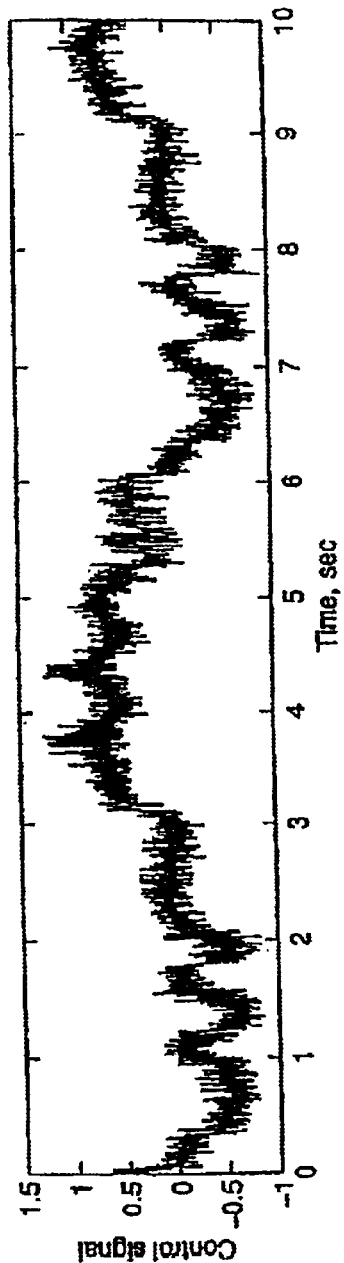

The experimental results are shown in FIGS. 3(a)–(c), showing a maximum tracking error of around 5 Tm. To further illustrate the effectiveness of the adaptive dither, the control results without the dither signal are shown in FIGS. 4(a)–(c).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Bibliography

[1] D. M. Alter and T. C. Tsao, Control of linear motors for machine tool feed drives: design and implementation of H∞ optimal feedback control, ASME J. of Dynamic systems. Measurement and Control, vol. 118, pp649–658, 1996.

[2] G. Otten, T. J. A. de Vries, J. van Amerongen, A. M. Rankers and E. W. Gaal, Linear motor motion control using a learning forward controller, IEEE/ASME Trans. on Mechatronics, vol.2(3), pp179–187, 1997

[3] B. Yao and M. Tomizuka, Adaptive robust control of SISO nonlinear systems in a semi-strict feedback form, Automatica, vol. 33(5), pp.893–900, 1997.

[4] K. K. Tan, S. N. Huang, H. F. Dou, S. Y. Lim, S. J. Chin, Adaptive Robust Motion Control for Precise Trajectory Tracking Applications, Mechatronics-submitted, 1999.

[5] K. K. Tan, T. H. Lee, S. Y. Lim, and H. F. Dou, Learning enhanced motion control of permanent magnet linear motor, Proc. of the third IFAC International Workshop on Motion Control, Grenoble, France, pp397–402, 1998.

What is claimed is:

1. A control system for controlling a plant having an operating characteristic which describes the translation of a plant input to a plant output, wherein the plant operating characteristic has a linear component and a non-linear component, the control system comprising:

a feedback control function; and a feed-forward control function, wherein a demand signal is simultaneously applied to respective inputs of the feedback and feed-forward control functions, and respective outputs of the feedback and feed-forward control functions are summed together to generate the plant input, the feed-forward control function having a first component which is a function of a model of the linear component of the plant characteristic, and a second component which is an adaptive function to compensate for the non-linear component of the plant characteristic, the adaptive function being substantially modeled on the non-linear component of the plant characteristic and having adaptive laws which vary parameters of the adaptive function with time such that the adaptive function approaches the non-linear component of the plant characteristic, and wherein the plant is a permanent magnet linear motor (PMLM) wherein the feedback control function is a Proportional/Integral/Derivative (PID) controller.

2. The control system of claim 1 wherein the non-linear component of the plant characteristic is of the form:

$$u_{ripple}=A(x)\sin(\omega x+\phi)=A_1(x)\sin(\omega x)+A_2(x)\cos(\omega x),$$

where x is the plant variable, and where the adaptive function has the form:

$$u_{AFC}=a_1(x(t))\sin(\omega x)+a_2(x(t))\cos(\omega x),$$

where $$\dot{a}_1(t)=-ge\dot{x}_d \sin(\omega x),$$

$$\dot{a}_2(t)=-ge\dot{x}\cos(\omega x),$$

e is an error signal given by:

$$e=(x_d-x),$$

g is an adaptation gain and is greater than 0, $X_d$ is the desired function of the plant variable and ω is related to 1/period of the non-linear component of the plant characteristic, such that the adaptive feed-forward control function continuously adjusts the parameters $a_1$ & $a_2$ in response to the error signal e.

3. The system of claim 2, wherein the plant variable x represents an instantaneous position of a translator of the linear motor, the desired function of the plant variable $x_d$, represents the desired trajectory of the translator and the PMLM has a magnetic structure having a pole pitch $x_p$, such that $\omega=2\pi/x_p$.

4. The system of claim 3 wherein the adaptation gain has a value which is greater than zero and less than or equal to one.

5. The system of claim 4 wherein the adaptation gain has a value which is less than 0.6.

6. The system of claim 5 wherein the adaptation gain has a value which is greater than or equal to 0.2.

7. The system of claim 6 wherein the adaptation gain is equal to 0.2.

* * * * *